(12) United States Patent
Lin

(10) Patent No.: US 7,716,976 B2
(45) Date of Patent: May 18, 2010

(54) METHOD AND APPARATUS FOR DETERMINING TIRE LOCATION IN A TIRE PRESSURE MONITORING SYSTEM USING DIRECTIONAL LOW FREQUENCY INITIATION

(75) Inventor: Xing Ping Lin, Orchard Lake, MI (US)

(73) Assignees: TRW Automotive U.S. LLC, Farmington Hills, MI (US); Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 11/982,496

(22) Filed: Nov. 2, 2007

(65) Prior Publication Data

US 2008/0127723 A1 Jun. 5, 2008

Related U.S. Application Data

(60) Provisional application No. 60/856,496, filed on Nov. 3, 2006.

(51) Int. Cl.
*B60C 23/02* (2006.01)
(52) U.S. Cl. ..................................... 73/146.4
(58) Field of Classification Search ........ 73/146–146.5; 340/442, 445, 447
See application file for complete search history.

(56) References Cited

U.S. PATENT DOCUMENTS

| 6,340,930 | B1 * | 1/2002 | Lin | 340/447 |
|---|---|---|---|---|
| 6,501,372 | B2 * | 12/2002 | Lin | 340/442 |
| 6,885,296 | B2 | 4/2005 | Hardman et al. | |
| 6,938,468 | B1 * | 9/2005 | Lin et al. | 73/146.5 |
| 6,948,360 | B2 * | 9/2005 | Lin | 73/146.5 |
| 6,995,731 | B2 * | 2/2006 | Lin | 343/895 |
| 7,073,377 | B2 * | 7/2006 | Lin | 73/146.8 |
| 7,148,793 | B2 * | 12/2006 | Lin | 340/442 |
| 7,334,463 | B2 * | 2/2008 | Lin | 73/146.4 |
| 2002/0105421 | A1 * | 8/2002 | Lin | 340/447 |
| 2002/0190852 | A1 * | 12/2002 | Lin | 340/445 |
| 2004/0036589 | A1 | 2/2004 | Lin | |
| 2004/0095233 | A1 | 5/2004 | DeZorzi et al. | |
| 2005/0122214 | A1 * | 6/2005 | Lin | 340/442 |
| 2005/0126275 | A1 * | 6/2005 | Lin | 73/146 |
| 2005/0150285 | A1 * | 7/2005 | Lin | 73/146.5 |
| 2005/0172707 | A1 * | 8/2005 | Kanatani et al. | 73/146 |
| 2005/0188757 | A1 * | 9/2005 | Lin et al. | 73/146.5 |
| 2005/0258951 | A1 * | 11/2005 | Lin | 340/447 |
| 2006/0179930 | A1 * | 8/2006 | Lin | 73/146.2 |
| 2006/0206247 | A1 * | 9/2006 | Lin | 701/29 |
| 2006/0259215 | A1 * | 11/2006 | Lin | 701/29 |
| 2008/0100446 | A1 | 5/2008 | Shintani | |

* cited by examiner

*Primary Examiner*—Lisa M Caputo
*Assistant Examiner*—Freddie Kirkland, III
(74) *Attorney, Agent, or Firm*—Tarolli, Sundheim Covell & Tummino LLP

(57) ABSTRACT

A method is provided for determining tire location in a tire pressure monitoring system having the steps of generating an initiation frequency signal having a controllable output adapted to be received by a selected one of a plurality of tires of the tire pressure monitoring system. At least two tires of the tire pressure monitoring system have associated initiation signal receivers. The method also includes transmitting a response signal from the selected tire receiving the initiation signal, the response signal having at least a unique identification signal portion associated with the selected tire. The method also receives the transmitted response signal and associates the identification signal with a location of the selected tire.

4 Claims, 4 Drawing Sheets

METHOD AND APPARATUS FOR DETERMINING TIRE LOCATION IN A TIRE PRESSURE MONITORING SYSTEM USING DIRECTIONAL LOW FREQUENCY INITIATION

RELATED APPLICATION

This application claims priority from U.S. provisional patent application Ser. No. 60/856,496, filed on Nov. 3, 2006, the subject matter of which is incorporated herein by reference.

TECHNICAL FIELD

The present invention is directed to a tire pressure monitoring system and, more particularly, a method and apparatus for determining tire location in a tire pressure monitoring system using directional low frequency initiation signals.

BACKGROUND OF THE INVENTION

Tire pressure monitoring systems having a pressure sensor and radio frequency ("RF") transmitter in each tire to transmit pressure information are known. Other information such as the tire's identification my also be transmitted. Various arrangements have been proposed for the on-board vehicle controller to associate the tire's identification code with the tire's location on the vehicle.

It is desirable to inform the vehicle driver which tire, by position on the vehicle, has low pressure. To do so, the tire pressure monitor system must be able to identify which tire pressure monitor transmitted a signal indicating low tire pressure. Therefore, each signal must be linked to its corresponding tire location. Since the transmitted RF signal includes an identifying code which differs for each tire on the vehicle, the tire pressure monitor system must associate or learn the vehicle tire location position with each identifying code.

One way to accomplish this learning or association is to place a low frequency ("LF") initiator in each wheel well and a corresponding LF receiver in each tire. Each LF initiator is then individually commanded to initiate an output signal that results in its associated tire receiving the LF signal and then transmitting an RF signal in response thereto including transmitting its identification ("ID") code. The vehicle's on-board RF receiver receives the response signal and records that ID code for that tire location. Any subsequently received signals with that ID code during vehicle use will be associated with that tire location for display on the vehicle cabin display for the vehicle driver. The pressure and tire position may be correlated this way. However, it is expensive to have a LF initiator located in each wheel well.

SUMMARY OF THE INVENTION

In accordance with the present invention, and method and apparatus are provided for determining location of tire pressure transmitters of a tire pressure monitoring system by controlling the strength and direction of an initiation signal from a single transmission location.

In accordance with one example embodiment of the present invention, a method is provided for determining tire location in a tire pressure monitoring system having the steps of generating an initiation frequency signal having a controllable output adapted to be received by a selected one of a plurality of tires of the tire pressure monitoring system. At least two tires of the tire pressure monitoring system have associated initiation signal receivers. The method also includes transmitting a response signal from the selected tire receiving the initiation signal, the response signal having at least a unique identification signal portion associated with the selected tire. The method also receives the transmitted response signal and associates the identification signal with a location of the selected tire.

In accordance with another example embodiment of the present invention, a method is provided for determining tire location on a vehicle in a tire pressure monitoring system comprising the steps of generating low frequency initiation signals, controlling transmission strength of the generated low frequency initiation signals and controlling transmission direction of the generated low frequency initiation signals so as to direct the generated low frequency initiation signals toward at least a selected one of a plurality of tires on a vehicle, at least two tires of the vehicle having associated initiation signal receivers. The method further includes transmitting a response signal from the at least a selected one tire receiving the initiation signal, the response signal having at least an unique identification signal portion associated with the at least a selected one tire receiving the initiation signal, receiving the transmitted response signal with the unique identification signal portion, and associating the received unique identification signal portion of the response signal with a location of the at least a selected one tire receiving the initiation signal on the vehicle.

In accordance with another example embodiment of the present invention, an apparatus is provided for determining a tire location in a tire pressure monitoring system comprising a generator for generating an initiation frequency signal having a controllable power output adapted to be received by a selected one of a plurality of tires of the tire pressure monitoring system, at least two tires of said tire pressure monitoring system having associated initiation signal receivers. The apparatus further includes a transmitter for transmitting a response signal from the selected tire receiving the initiation signal, the response signal having at least an identification signal portion and a receiver for receiving the transmitted response signal. A controller is provided for associating the identification signal with a location of the selected tire and for storing the associated identification and tire location in memory.

In accordance with yet another example embodiment of the present invention, an apparatus is provided for tire pressure monitoring apparatus for a vehicle comprising a generator for generating low frequency initiation signals, a controller for controlling transmission strength of said generated low frequency initiation signals and for controlling transmission direction of the generated low frequency initiation signals so as to direct the generated low frequency initiation signals toward at least a selected one of a plurality of tires on a vehicle. At least two tires of the vehicle have associated initiation signal receivers, the at least one selected tire receives the generated low frequency initiation signal and transmits a response signal, the response signal having at least an unique identification signal portion associated with the at least a selected one tire receiving the initiation signal. A receiver receives the transmitted response signal with the unique identification signal portion and associates the received unique identification signal portion of the response signal with a location of the at least a selected one tire location on the vehicle.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
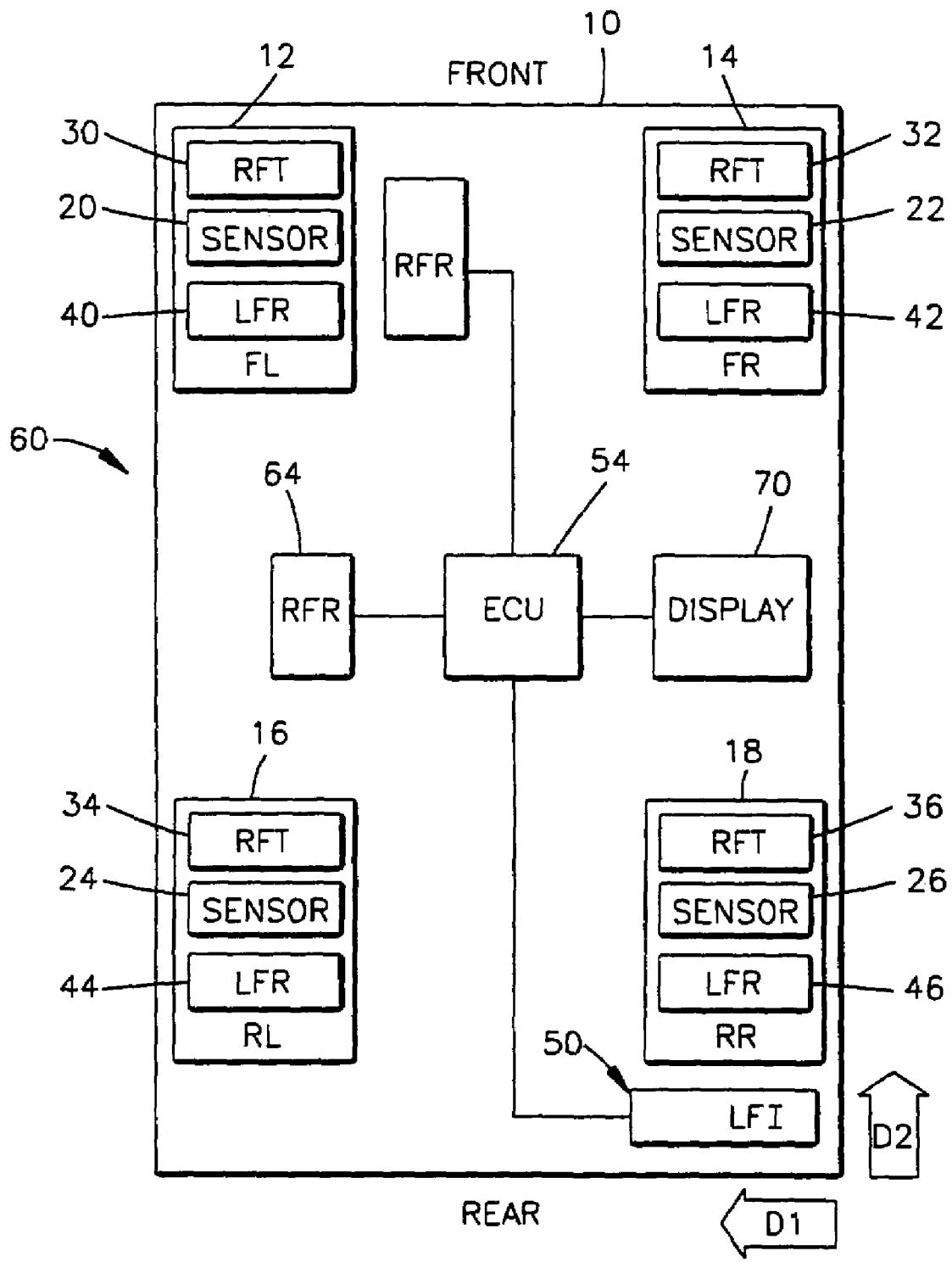
FIG. 1 is a schematic block diagram of a vehicle including one example embodiment of the present invention.

Referring to FIG. 1, a vehicle 10, in accordance with one example embodiment of the present invention, includes front left ("FL"), front right ("FR"), rear left ("RL"), and rear right (RR") vehicle tire locations, each having an associated vehicle tire, 12, 14, 16, 18, respectively, operatively mounted at associated vehicle locations.

Each of the tires 12, 14, 16, 18 has an associated sensor assembly 20, 22, 24, 26, respectively, mounted therewithin for measuring at least tire pressure and possibly other parameters of interest, such as temperature, for example. Each of the tires 12, 14, 16, 18 has an associated radio frequency transmitter ("RFT") 30, 32, 34, 36, respectively, that transmits an associated radio frequency ("RF") signal indicative of the sensed tire parameter, e.g., sensed tire pressure, information along with a unique identification code, for that tire. The transmission of RF signals during normal vehicle usage may be in response to a particular algorithm such as time, e.g., periodically, in response to tire pressure changes, e.g., a sudden change in pressure, or in response to any other desired control arrangement.

Each tire 12, 14, 16, 18 also has an associated low frequency receiver ("LFR") 40, 42, 44, 46, respectively, for receiving a low frequency ("LF") initiation signal. When a LF initiation signal is received by a LFR of a tire, the associated RFT for that tire transmits at least the tire's ID code in response thereto. The RFT may also transmit the tire's pressure value and/or any other sensed parameter measurements along with the associated tire's ID.

A low frequency initiator ("LFI") 50 is placed in one of the vehicle's wheel wells, such as, for example, the wheel well of the RR tire location as shown in FIG. 1. The position of the LFI is chosen such that each location of the vehicle tires 12, 14, 16, 18 from the LFI is a measurably different distance and direction from the others, i.e., the distance and direction between LFI 50 and tire 18 when the LFI is at the RR wheel well is different than the distance and direction between LFI 50 and tire 12.

An electronic control unit ("ECU") 54 of the tire pressure monitoring system 60 is electrically connected to the LFI 50 so as to controllably energize the LFI 50 to output the LF initiation signal when desired. A radio frequency receiver ("RFR") 64 is mounted in the vehicle 10 and is electrically connected to the ECU 54 for receiving any RF signals from any of the tires 12, 14, 16, 18 indicative of tire ID and/or measured tire parameters. The ECU 54 is connected to a display device 70 such as a liquid crystal display ("LCD") for displaying tire information to the vehicle operator such as tire pressure, tire temperature, and tire location.

Figure 2:
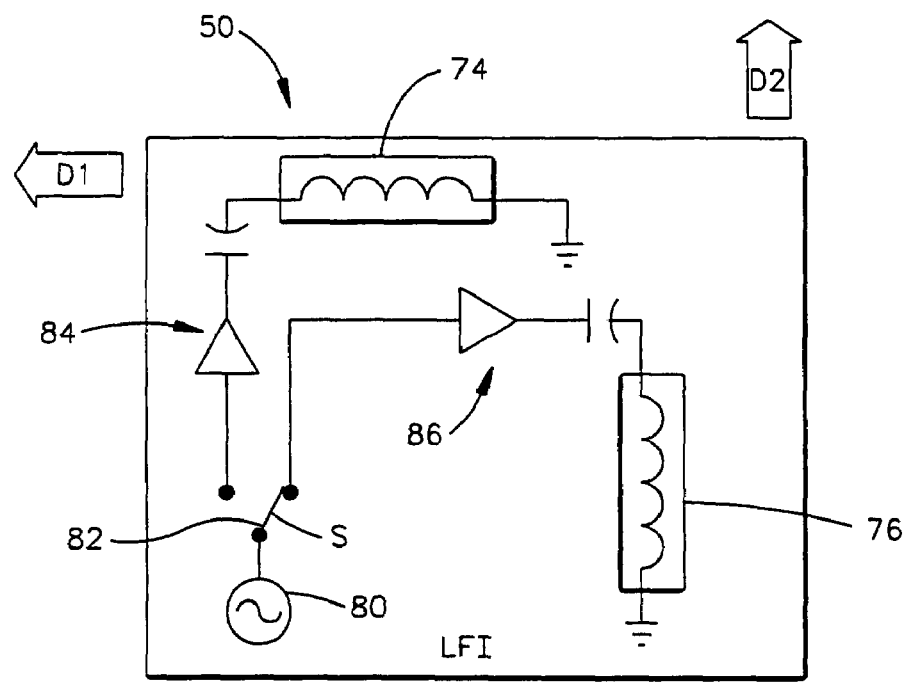
FIG. 2 is a schematic diagram of a low frequency ("LF") initiator shown in FIG. 1 in accordance with one example embodiment of the present invention.

Referring to FIGS. 1 and 2, a low frequency initiator 50, in accordance with one example embodiment of the present invention, is shown. LFI 50 includes a plurality of directionally oriented LF coils 74, 76. The coils 74, 76 are, in accordance with this example embodiment, oriented perpendicular to each other and mounted so that coil 76 is substantially parallel with the front-to-rear axis of the vehicle 10, known as the vehicle's X-axis. Coil 74 is substantially perpendicular with the front-to-rear axis of the vehicle 10, or parallel with the side-to-side axis of the vehicle, known as the vehicle's Y-axis. Although two coils 74, 76 are shown and described, it is possible that other numbers and combinations of coils and orientations of the coils may be used. The LFI 50 includes a low frequency oscillator 80 that is commanded on/off by the controller 54 and a switch 82 that connects the output of oscillator 80 to either coil 74 or coil 76 via drive circuit 84 or drive circuit 86, respectively. The controller 54 not only controls the on/off of the oscillator 80 but also controls the output power of the drive circuits to control the final output power of the LFI drive signal from the LF drive coils 74, 76. The power output of the two drive coils 74, 76 can be controlled by either controlling the amplitude of their output signal and/or by controlling the frequency of the output signal. The output power of the signal increases with increased amplitude and/or increased frequency. In turn, the output power of the signal decreases with decreased amplitude and/or decreased frequency.

Each of the LFRs 40, 42, 44, 46 is adapted to receive an LF initiating signal from the LF initiator LFI 50. In responsive to receiving an LF initiation signal, an LFR receiving the LF initiation signal will provide a signal to its associated RFT of its tire and, in turn, the initiated RFT will transmit an RF response signal including at least the tire's ID code. In reality, it is the unique ID code associated with that tire pressure monitor ("TPM") device within that tire. Such ID is also referred herein as the ID code associated with that tire location. The RFT may also transmit measured tire parameter information such as tire pressure and/or any other measured tire parameters. The LFRs 40, 42, 44, 46 that receive LF signals so as to control which RFTs 30, 32, 34, 36 transmit their associated ID signals to the ECU 54 to associate tire location with tire ID is controlled in response to several factors. First, the LFR receiving a LF signal is dependent upon which antenna 74 of 76 is energized (antenna direction) and also dependent upon the strength of the output signal transmitted from the antenna.

The RF receiver RFR 64 is, in accordance with an example embodiment of the present invention, located apart from the LF initiator LFI 50 on the vehicle 10 and an unequal distance from each of the locations of the wheels 12, 14, 16, and 18. The RFR 64 is adapted to receive RF signals transmitted by the RFTs 30, 32, 34, 36. The RFR also includes a received signal strength indication ("RSSI") circuit to determine the strength of any received RF signal.

The ECU 54 outputs one of several possible control signals to the LFI 50. In response thereto, the LFI 50 outputs an initiation signal that is received by one or more LFRs. Specifically, during a first initiation to learn the ID of RR tire, the ECU 54, outputs a control signal to LFI 50 so that oscillator 80 is connected via switch 82 to coil 74. The oscillator 80 is controlled to operate at a relatively low field strength by either a detuned frequency value (the frequency operating far away from the transmitting and receiving circuit resonating frequency) or reduced amplitude value but sufficient that LFR 46 can receive its signal. The coil orientation of coil 74 (direction) directs the field toward LFR 46. The field direction and strength ensures that only LFR 46 receives the LF initiation signal (or the LFR 46 has a higher percentage initiated response than the other LFRs). In response to the LF initiation signal, the RFT 36 transmits at least its ID signal to the RFR 64. The ECU 54 monitors the received ID signal and learns that ID and associates that ID in memory as being that of RR tire 18.

During a second initiation to learn the ID of RL tire 16, the ECU 54, outputs a control signal to LFI 50 so that oscillator 80 is connected via switch 82 to coil 74. The oscillator 80 is controlled to operate at relatively higher field strength by either a better tuned frequency value (close to the transmitting and receiving circuit resonating frequency) or higher amplitude value. The coil orientation of coil 74 directs the field toward LFR 44. The field direction and strength ensures that LFR 44 receives the LF initiation signal. Of course, LFR 46 will also receive the LF initiation signal. In response to the LF initiation signal, the RFT 36 transmits at least its ID signal to the RFR 64. In response to the LF initiation signal, the RFT 34 also transmits at least its ID signal to the RFR 64. The ECU monitors the two received ID signals and ignores the ID signal it knows is from the RR tire 18 that it previous learned from the first initiation. It learns the other ID from the RFT 34 and associates that ID in memory as being that of RL tire 16.

During a third initiation to learn the ID of RF tire, the ECU 54, outputs a control signal to LFI 50 so that oscillator 80 is connected via switch 82 to coil 76. The oscillator 80 is controlled to operate at a relatively low field strength by either a detuned frequency value (the frequency operating far away from the transmitting and receiving circuit resonating frequency) or reduced amplitude value but sufficient that LFR 42 can receive its signal. The coil orientation of coil 76 directs the field toward LFR 42. The field direction and strength ensures that LFR 42 receives the LF initiation signal. In response to the LF initiation signal, the RFT 32 transmits at least its ID signal to the RFR 64. The ECU monitors the received ID signal and learns that ID and associates that ID in memory as being that of RF tire 14. If any of the other RFTs 34, 36 respond, the ECU 54 ignores their response which were previously learned in the earlier steps.

When the ECU 54 receives a periodic forth ID signal during normal vehicle use, it will know that it must be from the FL tire since the other ID signals from the other tires have been learned. The ECU 54 will then associates that forth ID in memory as being that of FL tire 16.

Figure 3:
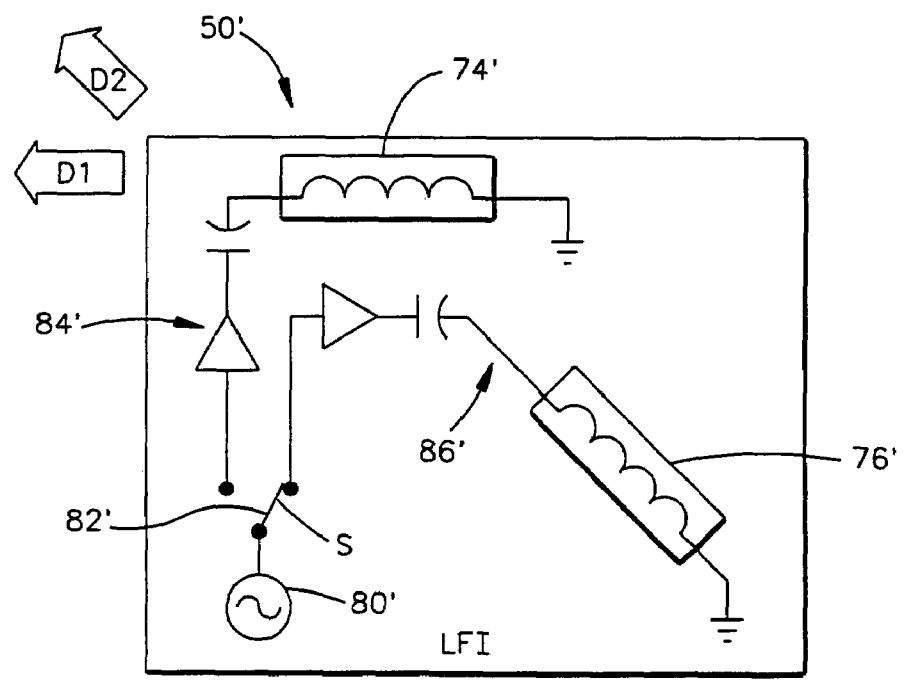
FIG. 3 is a schematic diagram of a low frequency ("LF") initiator shown in FIG. 1 in accordance with another example embodiment of the present invention.

Referring to FIG. 3, another example embodiment of the present invention is shown in an LFI 50' has a different orientation of LF transmission coils. In accordance with this example embodiment, during a first initiation to learn the ID of RR tire, the ECU 54, outputs a control signal to LFI 50' so that oscillator 80' is connected via switch 82' to coil 74'. The oscillator 80' is controlled to operate at a relatively low field strength by either a detuned frequency value (the frequency operating far away from the transmitting and receiving circuit resonating frequency) or reduced amplitude value but sufficient that LFR 46 can receive its signal. The coil orientation of coil 74' directs the field toward LFR 46. The field direction and strength ensures that only LFR 46 receives the LF initiation signal (or the LFR 46 has a higher percentage initiation response than the other LFRs). In response to the LF initiation signal, the RFT 36 transmits at least its ID signal to the RFR 64. The ECU 54 monitors the received ID signal and learns that ID and associates that in memory as being that of RR tire 18.

During a second initiation to learn the ID of RL tire 16, the ECU 54, outputs a control signal to LFI 50' so that oscillator 80' is connected via switch 82' to coil 74'. The oscillator 80 is controlled to operate at relatively higher field strength by either a better tuned frequency value (close to the transmitting and receiving circuit resonating frequency) or higher amplitude value. The coil orientation of coil 74' directs the field toward LFR 44. The field direction and strength ensures that LFR 44 receives the LF initiation signal. Of course, LFR 46 will also receive the LF initiation signal. In response to the LF initiation signal, the RFT 36 transmits at least its ID signal to the RFR 64. In response to the LF initiation signal, the RFT 34 also transmits at least its ID signal to the RFR 64. The ECU 54 monitors the two received ID signals and ignores the ID signal it knows is from the RR tire 18 that it previous learned from the first initiation. It learns the other ID from the RFT 34 and associates that ID in memory as being that of RL tire 16.

During a third initiation to learn the ID of FR tire, the ECU 54, outputs a control signal to LFI 50' so that oscillator 80' is connected via switch 82 to coil 76'. The oscillator 80' is controlled to operate at a relatively low field strength by either a detuned frequency value (the frequency far away from the transmitting and receiving circuit resonating frequency) or reduced amplitude value but sufficient that LFR 42 can receive its signal. The coil orientation of coil 76' (direction) directs the field toward LFR 42'. The field direction and strength ensures that LFR 42' receives the LF initiation signal. In response to the LF initiation signal, the RFT 32 transmits at least its ID signal to the RFR 64. The ECU 54 monitors the received ID signal and learns that ID and associates that in memory as being that of FR tire 14. If any of the other RFTs 34, 36 respond, the ECU 54 ignores their response as have previously been learned in the earlier steps.

During a forth initiation to learn the ID of FL tire 12, the ECU 54, outputs a control signal to LFI 50' so that oscillator 80 is connected via switch 82' to coil 76'. The oscillator 80 is controlled to operate at relatively higher field strength by either a better tuned frequency value (close to the transmitting and receiving circuit resonating frequency) or higher amplitude value. The coil orientation of coil 74' directs the field toward LFR 40. The field direction and strength ensures that LFR 40 receives the LF initiation signal. Of course, LFR 42 will also receive the LF initiation signal. In response to the FL initiation signal, the RFT 32 transmits at least its ID signal to the RFR 64. In response to the FL initiation signal, the RFT 34 also transmits at least its ID signal to the RFR 64. The ECU monitors the two received ID signals and ignores the ID signal it knows is from the RR tire 18 that it previous learned from the first initiation. It learns the other ID from the RFT 34 and associates that ID in memory as being that of FL tire 12.

With the example embodiments shown if FIGS. 2 and 3, the spare tire could be learned in an order depended on position relative to the LFI and coil orientation. The RF receiver RFR 64 can use its RSSI circuit to differentiate between received signals to better identify vehicle tire positions and the spare tire. The RF signal from the RF transmitter RFT on the tire closer to the RF receiver RFR 64 will have a higher average RSSI than the RF transmitter RFT on the other tire. Knowing whether the RF receiver RFR is located closer to the vehicle tire position or to the spare tire storage location, the tire pressure monitoring system can therefore assign the tire identification codes to the correlating vehicle tire, or spare tire storage, positions. When the vehicle is in the driving mode, the RSSI level from the spare tire is relatively constant (or very small change) compared to the RSSI signal from the sensors in the running tires. The spare tire sensor can be separated from the FL tire and other tire sensors by observing the RSSI variation.

Also, two orthogonal initiations can cover more range and angle and can help to initiate a response from the spare tire.

The LF coil positioning of the present invention makes use of the fact that an LF signal field is substantially stronger in a direction along the axis of the LF coil that generates the LF field than in any other direction. For example, the LF coil 74 generates a field which is strongest in a first direction D1, shown by arrow D1 in FIG. 2. Similarly, the LF coil 76, as depicted in FIG. 2, generates a field which is strongest in a second direction D2 perpendicular to the first direction D1, because the LF coil 76 is positioned perpendicularly to the LF coil 74.

One of ordinary skill in the art could readily determine the desired control and operation of the LF coils, however, for any chosen positioning or arrangement of LF coils; such choices are not essential to the operation of the present invention.

Figure 4A:
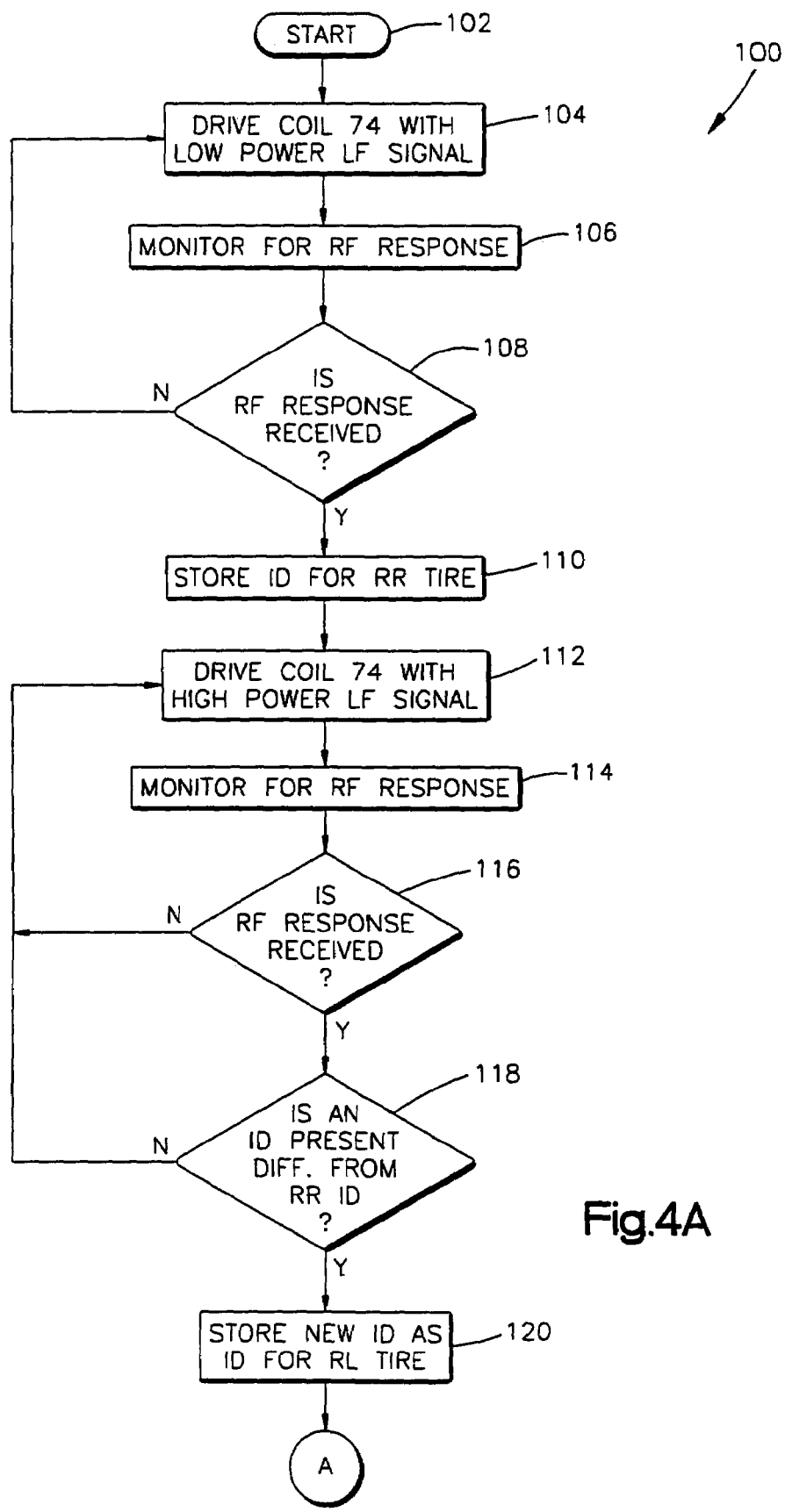
FIGS. 4A and 4B show a control process for associating tire identification codes with tire locations in accordance with one example embodiment of the present invention.
Figure 4B:
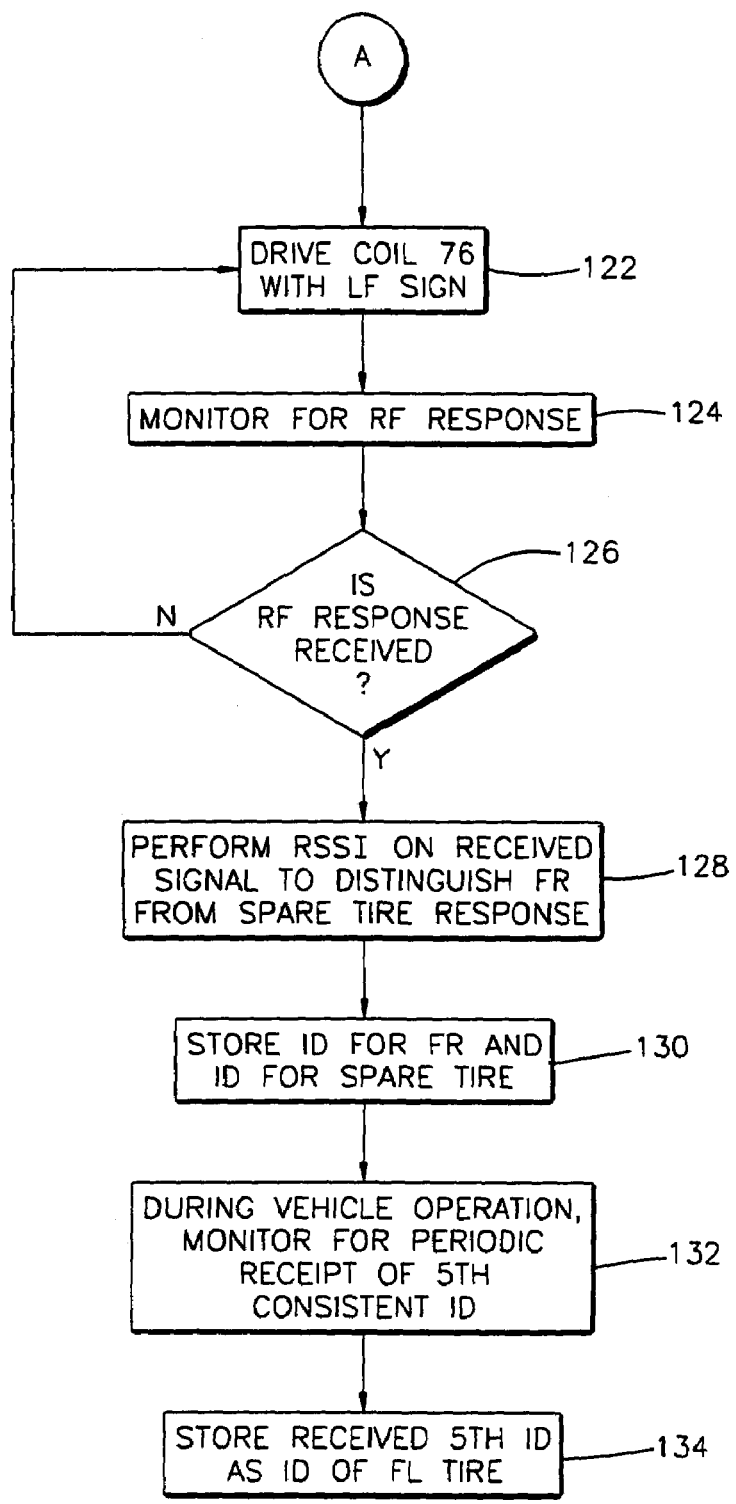

Referring to FIGS. 4A and 4B, an example embodiment of a control process 100 in accordance with the present invention is shown for learning tire identification codes in a tire pressure monitoring system and associating the ID codes with tire locations. The control process described with regard to FIGS. 4A and 4B assume use of the LFI shown in FIG. 2. Use of the LFI of FIG. 3 would require a slightly different control arrangement as discussed below.

The control process 100 starts at step 102 where a microcontroller (not shown) within the ECU 54, upon a power up condition, clears certain memories, sets internal flags to initial conditions, etc. The process proceeds to step 104 where the ECU 54 drives the coil 74 with a low power LF signal. The ECU 54 monitors for an RF response in step 106 via the RFR 64. In step 108, the ECU makes a determination if an RF response signal has been received. If the determination is negative, the process returns to step 104 and another LF low power signal is transmitted. If the determination in step 108 is affirmative, the process proceeds to step 110 where the ECU extracts the ID portion of the received RF signal and stores that ID in its internal memory as being from the RR tire 18. In effect, by storing the ID in its internal memory, the ECU is associating that ID with the RR tire or is learning that RR tire's ID.

The process then proceeds to step 112 where the ECU 54 drives the coil 74 with a high power LF signal. The ECU 54 monitors for an RF response in step 114 via the RFR 64. In step 116, the ECU makes a determination if an RF response signal has been received. If the determination is negative, the process returns to step 112 and another LF high power signal is transmitted. If the determination in step 116 is affirmative, the process proceeds to step 118 where a determination is made as to whether an ID present is different than the ID received corresponding to the RR tire. If the determination in step 118 is negative, the process returns to step 112. If the process is affirmative, the process proceeds to step 120 where the ECU extracts the different ID signal from the received RF signal and stores that different ID in its internal memory as being from the RL tire 16. In effect, by storing the ID in its internal memory, the ECU is associating that ID with the RL tire or is learning that RL tire's ID.

The process then proceeds to step 122 where the ECU 54 drives the coil 76 with a LF signal. The ECU 54 monitors for an RF response in step 124 via the RFR 64. In step 126, the ECU makes a determination if an RF response signal has been received. If the determination is negative, the process returns to step 122 and another LF signal is transmitted via coil 76. If the determination in step 126 is affirmative, the process proceeds to step 128. Typically, the ECU via the RFR will receive two RF signals in response to the LF signal from the coil 76, one from the FR tire and one from the spare tire (not shown). Using the RSSI circuitry and knowing which tire is physically closer to the RFR, it can be determined which ID is associated with the RF tire 14 and which is associated with the spare tire. In response to this determination, the ECU 54 will associate, store, and, in affect, learn the ID of the RF tire 14 and that of the spare tire and store that information in step 130. During vehicle operation, this information can be verified using the RSSI circuit because the RSSI circuit will detect variations in the RF signal but not the signal from the spare tire.

During normal vehicle operation, in step 132, the FL tire will periodically transmit tire pressure measurements along with its ID signal. When the ECU periodically receives this fourth tire ID, it can assume that the periodically received of a consistent ID is the ID associated with the FL tire 12 and stores that information in step 134.

A different orientation of the coil 76' such as that shown in FIG. 3 can be used to get a direct response to an LF initiation signal during from the FL tire 12 so as to alter the control arrangement in the learning/association phase. In such a case, learning of the FL tire would be similar to the learning of the other three tires using different power LF signals applied to the coil 76' instead of waiting for learning to occur in response to periodic transmissions during vehicle operation.

From the above description of the invention, those skilled in the art will perceive improvements, changes and modifications. Such improvements, changes and modifications within the skill of the art are intended to be covered by the appended claims.

Having described the invention, the following is claimed:

1. A method for determining tire location on a vehicle in a tire pressure monitoring system comprising the steps of:
   generating low frequency initiation signals;
   controlling transmission strength of said generated low frequency initiation signals;
   controlling transmission direction of said generated low frequency initiation signals so as to direct said generated low frequency initiation signals toward a first tire on a vehicle, the first tire and a second tire of said vehicle having associated initiation signal receivers;
   transmitting a response signal from the first tire upon receiving the initiation signal, the response signal having at least an unique identification signal portion associated with the first tire receiving the initiation signal;
   receiving the transmitted response signal from the first tire with the unique identification signal portion;
   associating the received unique identification signal portion of the response signal from the first tire with a location on the vehicle;
   readjusting signal strength of said generated low frequency initiation signal so that the second tire on said vehicle responds to each transmission of said readjusted signal strength initiation signal; and
   associating the received unique identification signal portion of the response signal from the second tire with a location on the vehicle.

2. An apparatus for determining tire locations in a tire pressure monitoring system comprising:
   a generator for generating an initiation frequency signal having a selectable one of two power output levels and adapted to be received by selected tires of the tire pressure monitoring system, at least two tires of said tire pressure monitoring system having associated initiation signal receivers;

each of the at least two tires having an associated transmitter for transmitting a response signal in response to receiving the initiation signal, the response signal having at least an identification signal portion;

a receiver for receiving the transmitted response signals; and a controller for controlling the generator power output level at a first selected level and a second selected level, a first of said at least two tires responding to the initiation signal at the first level and a second of said at least two tires responding to each initiation signal at the second level, and associating the received identification signals with tire location in response to the received response signals at the two selective levels and for storing the associated identifications and tire locations in memory.

3. The apparatus of claim 2 wherein the generator is a low frequency generator.

4. The transmitter of claim 2 wherein the transmitter is a radio frequency transmitter.

* * * * *